United States Patent [19]

Granville et al.

[11] 4,304,579
[45] Dec. 8, 1981

[54] EXTENDED AREA BAG FILTER

[75] Inventors: Richard C. Granville, Easton, Md.;
Thomas G. Frazier, New Hope, Pa.

[73] Assignee: Celeste Industries Corporation, Easton, Md.

[21] Appl. No.: 191,374

[22] Filed: Sep. 29, 1980

[51] Int. Cl.³ .............................................. B01D 46/02
[52] U.S. Cl. ...................................... 55/381; 156/224; 156/309.6; 264/273; 229/53
[58] Field of Search .......................... 55/367, 374–378, 55/361, 381; 156/224, 251, 302, 309.6; 264/320, 273, 322, 248; 229/53, 55; 493/339, 376, 393, 470, 473, 926, 924, 941; 150/48, 51; 29/428

[56] References Cited
U.S. PATENT DOCUMENTS

| | | | |
|---|---|---|---|
| 2,975,863 | 3/1961 | Sosnowich | 55/381 |
| 3,245,605 | 4/1966 | Meyerhoefer | 229/53 |
| 3,392,906 | 7/1968 | Fesco | 229/53 |
| 3,474,599 | 10/1969 | Schwab | 55/511 |
| 3,500,991 | 3/1970 | Vogt | 55/511 |
| 3,538,686 | 11/1970 | Schwab | 55/381 |

*Primary Examiner*—Bernard Nozick
*Attorney, Agent, or Firm*—Rummler & Snow

[57] ABSTRACT

A seamless expandable bag filter of nonwoven material using conventional filtering media and having 62% greater extended area than other commercially available extended arm filters and incorporating broad, flat sealing collars or plates on each side of the neck of the bag and sealing them together to insure a no-leak installation.

6 Claims, 6 Drawing Figures

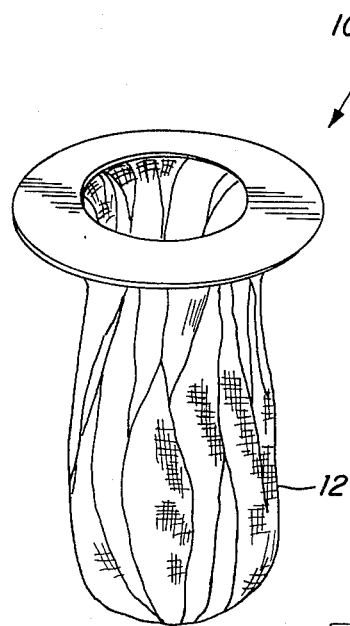
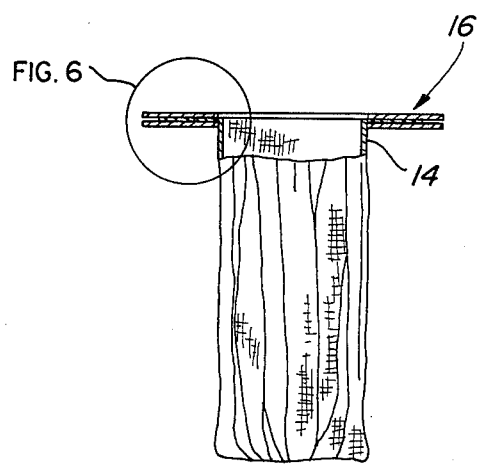
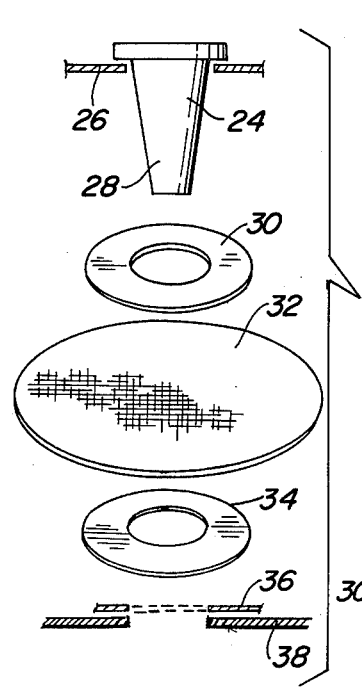
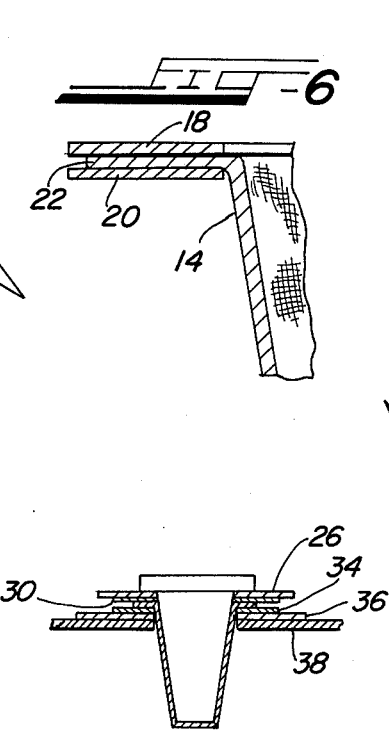
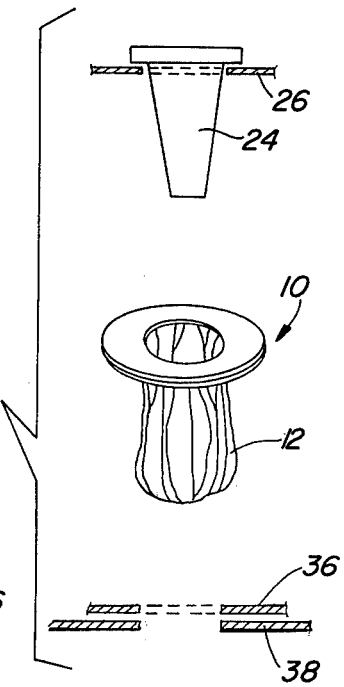

EXTENDED AREA BAG FILTER

BACKGROUND OF THE INVENTION

Most extended area expandable bag filters incorporating conventional filtering media employ sewn or heat-sealed seams which require greater effective filtration area for a given three-dimensional space to do a specific filtration job. Seams of any kind all reduce the life of bag filters and are leakable. There is also a need for a no-leak seal round the neck which is easy to install.

SUMMARY OF THE INVENTION

The gist of this invention lies in a filter comprising a seamless expandable bag made of crimped, conventional nonwoven filtering media having up to 62% greater extendable area than that of commercially available extended-area bags. A crimped neck at the top of the bag extends out into a flat, crimped, continuous circumferential flange. Broad top and bottom collars or plates with medial openings made of flat heat-sealable sheet material encompass in concentric relation said neck sandwiching inbetween the crimped flange about the top of the bag.

A method of constructing the extended-area bag filter with a crimped flanged neck comprises the steps of assembling a shaped draw-punch and die in a press and forming table; placing a bottom sealing member with a medial opening in concentric relation on top of the die and a bottom member of heat-sealable material having a medial opening therein in concentric relation on top of said bottom heat-sealing unit or ring. A blank of filter media is placed in concentric relation on top of said bottom sealing unit and a top sealing member of heat-sealable material is placed in concentric relation on top of said blank of filter media. A top heat-sealing unit or ring is placed in concentric relation on top of said top member and the nose of a punch inserted in concentric relation in said top filter member up to the extended area of said bag filter and a shoulder on said punch forming a flange about the neck of the same sealing the members together and ejecting the bag filter from said die.

BRIEF DESCRIPTION OF THE DRAWINGS

FIG. 1 shows a perspective view of the extended-area filter of this invention;

FIG. 2 shows a fragmentary cross-section of the sealing annuli sandwiching the crimped flange around the neck of the crimped bag of this filter;

FIG. 3 shows an exploded view of the filter in the punch press before forming;

FIG. 4 shows the same as FIG. 3 during forming;

FIG. 5 shows the filter being ejected from the press; and

FIG. 6 shows a fragmented, enlarged, cross-sectional detail of the sealing annuli sandwiching the crimped flange on the neck of the bag of the filter of this invention.

DESCRIPTION OF THE PREFERRED EMBODIMENT

Reference to FIG. 1 shows the extended-area filter 10 having an expandable crimped bag 12, mounting a crimped neck section 14 and a sealing annulus assembly 16, as shown in FIG. 2. Sealing assembly 16, as shown in FIG. 6, comprises a flat top collar or plate 18 having a medial opening therein and a flat bottom collar or plate 20 having a medial opening therein, both of heat-sealable sheet material arranged in mutually-stacked concentric relation and heat-sealed together, sandwiching a crimped flange 22 which extends from the top of the neck 14 of bag 12 and inbetween the top and bottom collars or plates 18, 20.

Reference to FIG. 3 shows a draw-punch 24 in a suitable punch press (not shown) having a shoulder 26 for forming the crimped flange 22 on neck 14 of expandable bag 12 and a shaped nose 28 in the form of an inverted truncated cone for drawing out the bag 12 into the crimped expandable shape desired when the noses 28 of the punch 24 is fully inserted in concentric relation through a top heat-sealing ring or of other geometric shape 26 and a top sealing annular 30 made of heat-sealable material in stacked relation to draw out a circular blank 32 made of filtering media which may be nonwovens, glass padding, paper films, wire mesh and felts to the shaped desired. The nose 28 of punch 24 continues through a top sealing annulus 30 made of heat-sealable material in stacked relation with a bottom sealing collar or plate 34 made of heat-sealable material, a bottom heat-sealing ring or other geometric shape 36 and into a die 38, as shown in FIG. 4, to be ejec-ed from the die, as shown in FIG. 5.

In the operation of the process of this invention, the die 38 is placed on the forming table (not shown) in concentric relation with the draw-punch 24 thereon. The bottom heat-sealing ring or other geometric shape 36 is placed in concentric relation on the top of die 38; the bottom heat-sealing collar or plate 34 is placed in concentric relation on the top of heat-sealing medium 36; the blank of filter media 32 is placed in concentric relation on top of the bottom heat-sealing collar or plate 34; and the top heat-sealing collar or plate 30 is placed in concentric relation on the top of the blank 32. The top heat-sealing unit 26 has meanwhile been placed in concentric relation on the nose 28 of the draw-punch 24 up against the bottom side of the shoulder 26 around the top of the same.

The draw-punch then has downward pressure applied thereto until it compacts against the die 38. Heat-sealing units 26, 36 are energized to seal the top and bottom annulus together with the crimped flange therebetween. The finished product is then allowed to cool and then removed.

It should be understood that this invention may employ any geometric shaped heat-sealing collar or plate and they may be secured together by other than a heat-sealing annulus of any geometric shape. Also, the collars or plates may be secured together by other than by heat-sealing, such as by stapling or other mechanical fastening means.

Although but one specific embodiment of this invention is herein shown and described, it will be understood that details of the construction shown may be altered or omitted without departing from the spirit of the invention as defined by the following claims.

We claim:

1. A seamless extended-area bag filter made of conventional filtering media comprising:
   (a) a seamless bag of substantially globular shape having longitudinally-formed crimps throughout its length and having a crimped neck having a flange, said flange, positioned transversely to the length of the bag, (b) top and bottom broad sealing collars, said crimped flange positioned between said collars, (c) means for sealing the collars together in face-to-face relation and sandwiching said flange therebetween whereby filtrate coming into said bag will fully extend the bag to globular shape when it becomes filled.

2. The device according to claim 1 wherein said means for sealing is a pair of flat broad heat-sealing collars.

3. The device according to claim 1 wherein the sealing collars are plates having medial openings therein.

4. The device according to claim 1 wherein the means for sealing said collars together is by mechanical means.

5. A method of constructing a seamless extended-area bag filter comprising the steps:

(a) assembling a formed draw-punch having a flange and die in a punch press;

(b) placing a bottom sealing means in concentric relation on top of said die;

(c) placing a bottom sealing collar of heat-sealable material in concentric relation on top of said bottom sealing means;

(d) placing a blank of filter media in concentric relation on top of said bottom filter collar;

(e) placing a top sealing collar of heat-sealable material in concentric relation on top of said blank of filter media;

(f) placing a top sealing means in concentric relation on top of said top filter annulus;

(g) inserting said formed draw-punch under pressure in concentric relation in said top collar up to the extended area of said bag filter;

(h) forming a crimped flange about the neck of the same;

(i) sealing said top and bottom collars with said crimped flange therebetween; and (j) ejecting the bag filter from said die.

6. The method according to claim 5 wherein the sealing means is a heat-sealing ring and said collar is a flat plate having a medial opening therein.

* * * * *